United States Patent
Ikemoto

(10) Patent No.: US 6,830,042 B2
(45) Date of Patent: Dec. 14, 2004

(54) SYSTEM FOR CALCULATING AIR-FUEL RATIO OF EACH CYLINDER OF MULTICYLINDER INTERNAL COMBUSTION ENGINE

(75) Inventor: Noriaki Ikemoto, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/821,948

(22) Filed: Apr. 12, 2004

(65) Prior Publication Data

US 2004/0200464 A1 Oct. 14, 2004

(30) Foreign Application Priority Data

Apr. 14, 2003 (JP) .......................... 2003-109109

(51) Int. Cl.[7] .............................................. F02D 41/00
(52) U.S. Cl. ...................................... 123/673; 701/109
(58) Field of Search ........................... 123/673, 672, 123/434; 701/109

(56) References Cited

U.S. PATENT DOCUMENTS

| | | | |
|---|---|---|---|
| 5,524,598 A | | 6/1996 | Hasegawa et al. |
| 5,540,209 A | * | 7/1996 | Hasegawa et al. .......... 123/679 |
| 5,730,111 A | | 3/1998 | Kaji et al. |
| 5,806,012 A | * | 9/1998 | Maki et al. .................. 701/104 |
| 5,908,463 A | * | 6/1999 | Akazaki et al. ............. 701/104 |
| 6,173,571 B1 | * | 1/2001 | Kaneko et al. ............... 60/286 |
| 6,481,201 B2 | * | 11/2002 | Kako et al. ................... 60/285 |
| 6,708,681 B2 | * | 3/2004 | Hosoya et al. .............. 123/681 |

FOREIGN PATENT DOCUMENTS

JP  3-37020  6/1991

* cited by examiner

*Primary Examiner*—John T. Kwon
(74) *Attorney, Agent, or Firm*—Nixon & Vanderhye P.C.

(57) ABSTRACT

An ECU calculates the air-fuel ratio of each cylinder based on a sensor signal from an A/F sensor arranged at the collecting portion of the exhaust manifold and feedback controls the fuel injection quantity for each cylinder by using the individual cylinder air-fuel ratio obtained. A collecting portion fuel quantity is calculated from the air-fuel ratio at the exhaust collecting portion based on from the A/F sensor signal, and the gas flow rate at the exhaust collecting portion is calculated using the gas flow rate history of each cylinder. An observer using the individual cylinder fuel quantity as a variable is constructed by a model in which the collecting portion fuel quantity is associated with the individual cylinder fuel quantity, so that the individual cylinder fuel quantity is estimated from the result of observation by the observer. Each cylinder's air-fuel ratio is calculated from the estimated individual cylinder fuel quantity.

10 Claims, 4 Drawing Sheets

SYSTEM FOR CALCULATING AIR-FUEL RATIO OF EACH CYLINDER OF MULTICYLINDER INTERNAL COMBUSTION ENGINE

CROSS REFERENCE TO RELATED APPLICATIONS

This application is based upon, claims the benefit of priority of, and incorporates by reference Japanese Patent Application No. 2003-109109 filed Apr. 14, 2003.

BACKGROUND OF THE INVENTION

1. Field of the Invention

The present invention relates to a system for calculating an air-fuel ratio of each cylinder of a multicylinder internal combustion engine, and more particularly to a technique whereby, using an air-fuel ratio sensor installed in an exhaust collecting portion of a multicylinder internal combustion engine, an air-fuel ratio of each cylinder is suitably calculated based on a sensor detection signal from the air-fuel ratio sensor.

2. Description of the Related Art

Generally, an air-fuel ratio control system detects an exhaust gas-fuel ratio of an internal combustion engine and controls the fuel injection quantity to achieve a target air-fuel ratio. However, in a case where this type of control system is used for a multicylinder internal combustion engine, the intake air quantity will vary among the cylinders depending on intake manifold configurations, intake valve operation, or the like. Also, in case of an MPI (multi-point injection) system whereby cylinders are each provided with a fuel injection valve so that fuel is injected individually to each cylinder, the injected fuel quantity will vary among the cylinders due to inherent differences of fuel injectors. These variations among the cylinders are detrimental to the accuracy of controlling the fuel injection quantity. An example of countermeasures to this problem is disclosed in Japanese Patent Laid-Open Publication No. Hei 8-338285 (1996), according to which, when an air-fuel ratio is detected by an air-fuel ratio sensor, a particular cylinder corresponding to the exhaust for which the air-fuel ratio is to be actually detected is identified, so that the air-fuel ratio is individually feedback controlled for each identified cylinder each time.

Additionally, according to Japanese Patent Publication No. Hei 3-37020 (1991), the air-fuel ratio at an exhaust collecting portion is detected by the use of an air-fuel ratio sensor, and the fuel quantity supplied to the corresponding cylinder is corrected by taking into consideration the time delay caused by the exhaust from the corresponding cylinder to arrive at the air-fuel ratio sensor.

However, with the technologies as disclosed above, since exhaust gases from the various cylinders are mixed together at the exhaust collecting portion, the variations among the cylinders will not be eliminated sufficiently, and thus there is a desire for further improvement with respect to this aspect. The technology disclosed in Japanese Patent Publication No. Hei 3-37020 (1991), in particular, is only effective for the case where the exhaust gas forms layers in the direction of the pipes. It is true that the air-fuel ratio for each cylinder can be obtained with a high degree of accuracy by arranging an air-fuel ratio sensor at each branched pipe of the exhaust manifold; however, this requires the same number of air-fuel ratio sensors as the number of the cylinders, resulting in a cost increase.

The publication of Japanese Patent No. 2717744 discloses a technology whereby the air-fuel ratio at an exhaust collecting portion is modeled as a mixture of air-fuel ratios of a plurality of cylinders and an air-fuel ratio of each cylinder is detected by means of an observer in terms of the internal state as the air-fuel ratio of each cylinder. However, since the air-fuel ratio at the exhaust collecting portion is an air-fuel ratio of the mixture of exhaust gas from the cylinders, it is not possible to accurately detect the air-fuel ratio of each individual cylinder if the exhaust gas quantity is changed or if there is variation in exhaust gas quantity among the cylinders.

SUMMARY OF THE INVENTION

In view of the drawbacks as stated above, an object of the present invention is to provide a system that is capable of calculating an air-fuel ratio of each cylinder of a multicylinder internal combustion engine with a high degree of accuracy, and thus capable of improving the accuracy of fuel injection control performed using the individual cylinder air-fuel ratio.

In a multicylinder internal combustion engine according to an embodiment of present invention, a plurality of exhaust passages connected to respective cylinders are merged together at an exhaust collecting portion and an air-fuel ratio sensor is arranged at this exhaust collecting portion. The air-fuel ratio sensor detects an air-fuel ratio in the state where exhaust gases from the cylinders are mixed together. In this regard, accurate calculation of the air-fuel ratio of each of the cylinders (individual cylinder air-fuel ratio) is required for controlling the fuel injection quantity for each cylinder accurately without any excess or deficiency. Since it is believed that an air-fuel ratio at the exhaust collecting portion obtained from a sensor detection signal from the air-fuel ratio sensor is affected by the mixture of exhaust gases in the exhaust system, the present invention proposes a technique that enables accurate calculation of an individual cylinder air-fuel ratio by giving due consideration to the effects due to the mixture of exhaust gases. Specifically, such consideration is given to the effects due to the mixture of exhaust gases by reflecting the gas flow rate history of each of the cylinders.

More specifically, according to an aspect of the invention, the air-fuel ratio at the exhaust collecting portion is calculated by using a sensor detection signal from an air-fuel ratio sensor while at the same time the gas flow rate at the exhaust collecting portion is calculated based on the gas flow rate history of each cylinder. Further, on the basis of the air-fuel ratio at the exhaust collecting portion and the gas flow rate at the exhaust collecting portion thus obtained, the fuel quantity at the exhaust collecting portion is calculated as the burnt fuel quantity corresponding to these values. Furthermore, an observer using an individual cylinder fuel quantity as a variable is constructed by a model in which the collecting portion fuel quantity is associated with the individual cylinder fuel quantity, so that the individual cylinder fuel quantity is estimated from the result of observation by the observer. The individual cylinder air-fuel ratio is then calculated using the individual cylinder fuel quantity thus estimated. In a fuel injection control system, the fuel injection quantity for each of the cylinders is feedback controlled by using the individual cylinder air-fuel ratio obtained each time. An observer computes a variable, which is defined by a model.

According to the constitution described above, the gas flow rate at the exhaust collecting portion is calculated based on the gas flow rate history of each cylinder, so that the thus obtained gas flow rate at the exhaust collecting portion duly reflects variations among the cylinders. Accordingly, it is possible to calculate the fuel quantity at the collecting portion, duly reflecting the effects of the mixture of exhaust gases in the exhaust circuit, and hence to improve the accuracy of the individual cylinder fuel quantity estimated by the observer. As the result, an accurate individual cylinder air-fuel ratio can be obtained even if the intake air quantity differs from cylinder to cylinder. In this manner, it is possible to calculate the individual cylinder air-fuel ratio accurately and hence to improve the accuracy of fuel injection control that is performed using the individual cylinder air-fuel ratios. Note that the individual cylinder gas flow rate includes the individual cylinder intake air quantity introduced into each of the cylinders as well as the exhaust gas quantity discharged from each of the cylinders.

The model in which the collecting portion fuel quantity is associated with the individual cylinder fuel quantity may be, according to another aspect of the invention, a model in which the collecting portion fuel quantity is associated as a weighted average of a fuel quantity history of each cylinder.

According to yet another aspect of the invention, the individual cylinder fuel quantity is estimated by a Kalman filter type observer. The Kalman filter type observer handles an estimated value statistically so that errors can be absorbed. Therefore, it is possible to more accurately obtain the individual cylinder air-fuel ratio.

According to still another aspect of the invention, the gas flow rate at the exhaust collecting portion is calculated by using a model in which the gas flow rate for each cylinder is associated with the gas flow rate at the exhaust collecting portion. Thus, it is possible to calculate the gas flow rate at the exhaust collecting portion, duly reflecting cylinder-to-cylinder variations in gas flow rate (exhaust gas quantity or intake air quantity).

According to yet another aspect of the invention, in the system for calculating the air-fuel ratio of the immediately prior aspect, the gas flow rate at the exhaust collecting portion may be calculated by using a model in which the weighted average of the gas flow rate history of each cylinder is associated as the gas flow rate at the exhaust collecting portion.

According to still another aspect of the invention, the system further utilizes a filter means for compensating the phase delay of the sensor detection signal sent by the air-fuel ratio sensor so that the collecting portion fuel quantity is calculated based on the output from the filter means and the gas flow rate at the exhaust collecting portion. Specifically, the air-fuel ratio sensor sends output (sensor detection signal) with a time delay after receiving an input (i.e. actual air-fuel ratio), and therefore the waveform of the output is rounded in response to the change of input. If the phase delay of the sensor detection signal is compensated by the filter means, a true input without time delay can be obtained and hence the accuracy of the individual cylinder air-fuel ratio can be improved. Variations due to inherent differences or changes with time can also be absorbed. For example, the filter means may be constituted by a Kalman filter so that the actual air-fuel ratio can be correctly estimated.

Further, according to another aspect of the invention that is based on the premise that as exhaust gases from the cylinders are merged at the exhaust collecting portion, the air-fuel ratio at the exhaust collecting portion is detected by an air-fuel ratio sensor, and an individual cylinder air-fuel ratio is calculated based on a sensor detection signal from the air-fuel ratio sensor. Particularly, the air-fuel ratio at the exhaust collecting portion is calculated based on the sensor detection signal and the gas flow rate history of each cylinder. Further, an observer using the individual cylinder air-fuel ratio as a variable is constructed by a model in which the air-fuel ratio at the exhaust collecting portion is associated with the individual cylinder air-fuel ratio so that the individual cylinder air-fuel ratio is estimated based on the result of observation by the observer. In the fuel injection control system constituted in this manner, the fuel injection quantity for each of the cylinders is feedback controlled using the individual cylinder air-fuel ratio obtained each time.

According to the constitution of the immediately preceding aspect, since the air-fuel ratio at the exhaust collecting portion is calculated reflecting the gas flow rate history of each cylinder, the air-fuel ratio at the exhaust collecting portion can be obtained while giving due consideration to variations in the gas flow rate among the cylinders. Therefore, the accuracy of the individual cylinder air-fuel ratio estimated by the observer can be improved and the calculation error can be minimized even if each cylinder has a different intake air quantity. As the result, it is possible to calculate an individual cylinder air-fuel ratio with high precision and thus to improve the accuracy of fuel injection control performed using this individual cylinder air-fuel ratio.

According to another aspect of the invention, the air-fuel ratio at the exhaust collecting portion is calculated by using a sensor model for compensating the phase delay of a sensor detection signal output by the air-fuel ratio sensor. Specifically, the air-fuel ratio sensor sends an output (sensor detection signal) with a time delay after receiving an input (i.e. actual air-fuel ratio), and therefore the waveform of the output is rounded in response to the change of input. If the phase delay of the sensor detection signal is compensated by the sensor model, a true input without time delay can be obtained and hence the accuracy of the individual cylinder air-fuel ratio can be improved. Variations due to inherent differences or changes with time can also be absorbed. For example, the sensor model may be constituted by a Kalman filter so that the actual air-fuel ratio can be correctly estimated.

According to another aspect of the invention, in case of a multicylinder internal combustion engine having an intake control system capable of controlling the intake air quantity for each of the cylinders, the intake air quantity tends to vary among the cylinders. However, according to the invention, an air-fuel ratio of each individual cylinder can be calculated accurately even in such a case. An example of the known intake control systems is one employing an adjustable valve mechanism constructed such that the conditions for opening/closing the intake valve (e.g. valve lift quantity and opening/closing timing) can be variably adjusted on a continuous basis.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

According to this embodiment, an engine control system is constructed for a 4-cylinder gasoline engine that is a type of multicylinder internal combustion engine. This control system controls the fuel injection quantity, ignition timing and the like principally by means of an electronic control unit thereof (hereinbelow to be referred to as "ECU"). First, the outline of the engine control system according to the embodiment will be described referring to FIG. 1.

Figure 1:
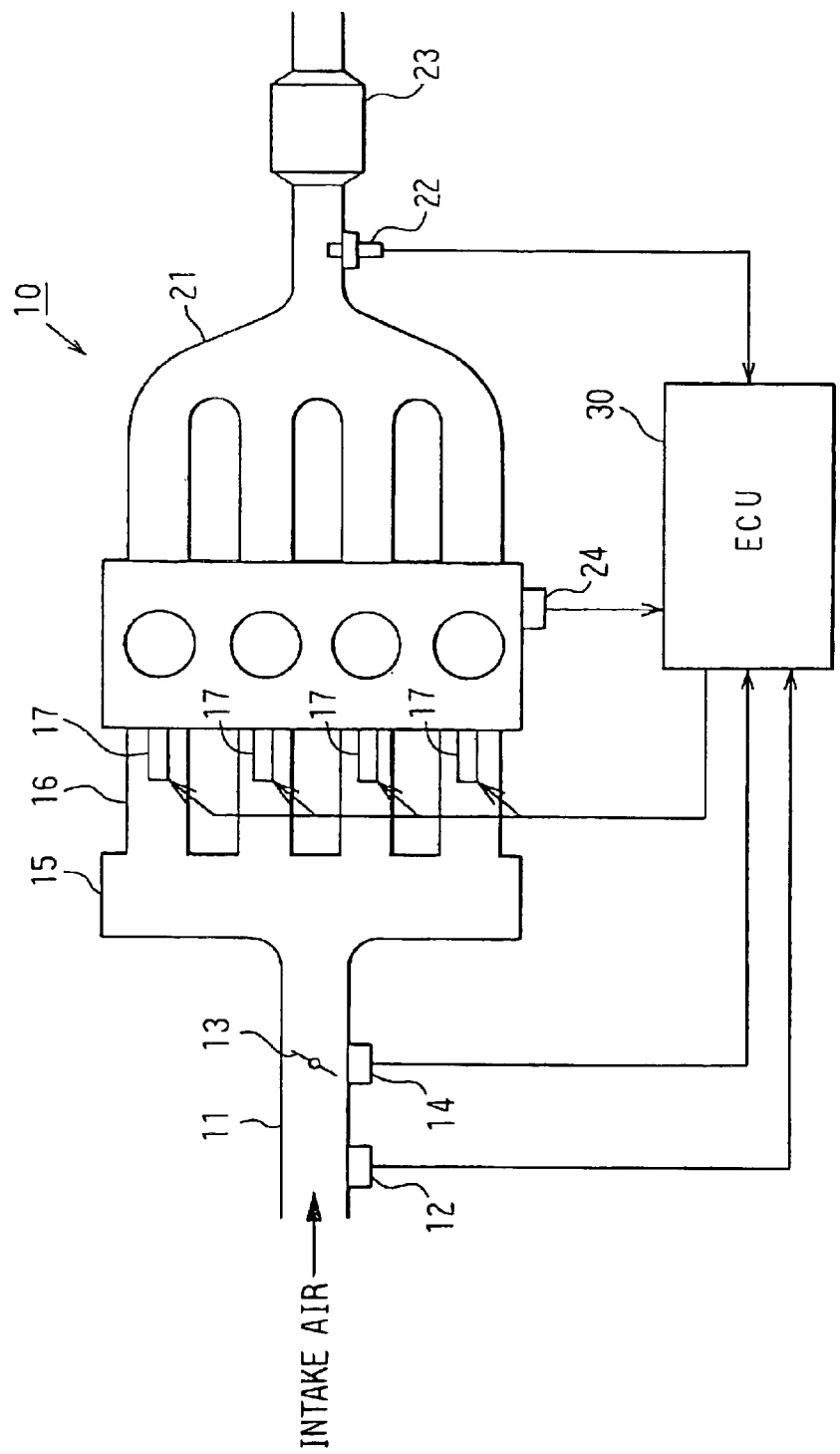
FIG. 1 is a diagram of the outline of an engine control system according to an embodiment of the present invention.

In the engine 10 shown in FIG. 1, an air flow meter 12 is provided at an upstream part of an intake pipe 11 for detecting an intake air quantity. A throttle valve 13, the opening of which is adjusted according to a degree of depression of an accelerator pedal (not shown), and a throttle opening sensor 14 for detecting the throttle opening are provided downstream of the air flow meter 12. Further, a surge tank 15, provided downstream of the throttle valve 13, is connected to an intake manifold 16 for introducing air to the cylinders of the engine 10. In the intake manifold 16, an electromagnetically driven fuel injection valve 17 is mounted in the vicinity of an intake port of each of the cylinders for injecting and supplying fuel to the cylinder. Intake air and fuel injected from the fuel injection valve 17 are mixed at the intake port of each of the cylinders to form an air-fuel mixture, and, as the intake valve (not shown) is opened, the air-fuel mixture is introduced into the cylinder combustion chamber to be used for combustion.

The air-fuel mixture that has been used for combustion in the engine 10 is discharged as exhaust gas via an exhaust manifold 21 as an exhaust valve (not shown) is opened. The collecting portion of the exhaust manifold 21 (hereinbelow, to be referred to as "exhaust collecting portion") is provided with an A/F sensor 22 for detecting the air-fuel ratio of air-fuel mixture with respect to the exhaust gas. A catalyst 23 such as a three-way catalyst is provided downstream of the A/F sensor 22 for purging CO, HC, NOx or the like from the exhaust gas. The A/F sensor 22 serves as an air-fuel ratio sensor and linearly detects an air-fuel ratio in a wide range. Further, the engine 10 is provided with a crank angle sensor 24 for detecting a rotational position of the engine 10 at every predetermined crank angle.

Outputs from various sensors including the air flow meter 12, the throttle opening sensor 14, the A/F sensor 22, and the crank angle sensor 24, as described above, are received by an ECU 30 that conducts control of the engine. The ECU 30 is principally constituted by a microcomputer composed of a CPU, ROM, RAM and the like and executes various control programs stored in the ROM for conducting various engine control operations according to various operational states of the engine detected at the time of control. In the fuel injection control, for example, the air-fuel ratio is detected based on a sensor signal (sensor detection signal) given by the A/F sensor 22 and the fuel injection quantity is feedback controlled for each of the cylinders in accordance with a difference between a detected air-fuel ratio and a target air-fuel ratio.

In the present embodiment, particularly, an air-fuel ratio of each individual cylinder is calculated using the technique for observing the state of a dynamic model according to the modern control theory so that the fuel injection control is performed by using the air-fuel ratios thus obtained. Particulars of this method will be described below.

It is required to calculate accurately an air-fuel ratio of each individual cylinder in order to control the fuel injection quantity of each individual cylinder accurately, without excess or deficiency. In this regard, an air-fuel ratio at the exhaust collecting portion obtained from a sensor signal from the A/F sensor 22 is possibly affected by the mixture of exhaust gas in the exhaust circuit. The present embodiment, therefore, proposes a technique of accurately calculating an air-fuel ratio of each cylinder by giving due consideration to the possible effects of the mixture of exhaust gas.

Specifically, an air-fuel ratio at the exhaust collecting portion is calculated based on a sensor signal from the A/F sensor 22 and gas flow rate history for each individual cylinder, while an observer using an air-fuel ratio of each cylinder as a variable is constructed in a model in which an air-fuel ratio at the exhaust collecting portion is associated with an air-fuel ratio of each cylinder so that the air-fuel ratio of each cylinder is estimated from the result of observation by the observer. Here, the gas flow rate corresponds to an exhaust gas quantity or intake air quantity. The air-fuel ratio is a mass ratio between an air quantity and fuel quantity (air quantity/fuel quantity). Since a fuel quantity thus can be obtained by multiplying an air quantity by the inverse number of an air-fuel ratio, it is also possible to use, instead of the air-fuel ratio at the exhaust collecting portion, a burnt fuel quantity corresponding thereto as a parameter so that the fuel quantity for each cylinder is obtained based on the burnt fuel quantity.

Figure 2:
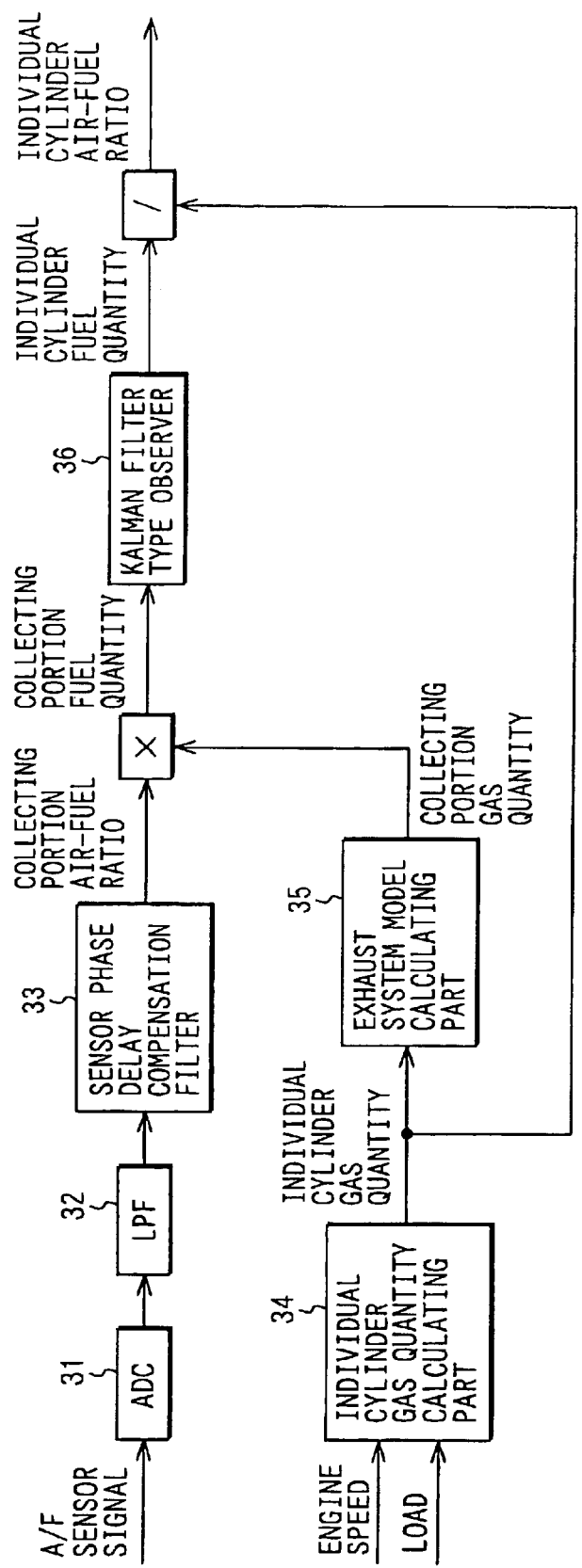
FIG. 2 is a block diagram of the outline of a system for calculating an air-fuel ratio of each individual cylinder.
Figure 3:
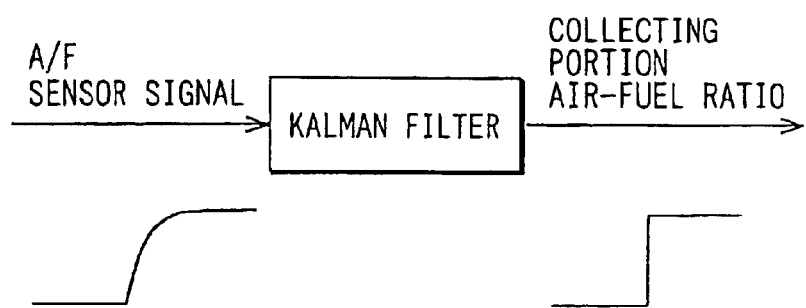
FIG. 3 is a block diagram of a sensor phase delay compensation filter.

FIG. 2 is a block diagram showing the outline of a system for calculating an air-fuel ratio of each cylinder. In practice, this calculating system is realized by the ECU 30. As shown in FIG. 2, a detection signal from the A/F sensor 22 is digitally converted by an A/D converter 31 and then high-frequency noise is eliminated therefrom by an LPF 32 designed appropriately. Thereafter, a phase delay of the A/F sensor 22 is compensated by a sensor phase delay compensation filter 33. The LPF 32 may be a primary FIR filter, for example. An air-fuel ratio at the exhaust collecting portion (hereinbelow, to be referred to as "collecting portion air-fuel ratio") is obtained based on the output of the sensor phase delay compensation filter 33. In the present embodiment, the sensor phase delay compensation filter 33 serving as a filter means (sensor model) is realized by a Kalman filter. As shown in FIG. 3, a collecting portion air-fuel ratio with no sensor phase delay (corresponding to an actual air-fuel ratio) can be obtained by using the Kalman filter. Here, an observer using the collecting portion air-fuel ratio as a variable is constructed by a model in which a collecting portion air-fuel ratio is associated with a sensor signal, and the collecting portion air-fuel ratio can be estimated with high precision based on the result of observation by this observer.

The gas flow rate for each individual cylinder (hereinbelow, to be referred to as "individual cylinder gas quantity") is calculated by an individual cylinder gas quantity calculating part 34, according to the operational state of the engine. Specifically, an individual cylinder gas quantity is calculated using an engine speed and load map in which current engine speed and current engine load are used as parameters. The engine speed and load map are set after studying, in advance, cylinder-to-cylinder variations in intake air quantity or the like. The engine load is obtained, for example, based on the ratio of intake air charging efficiency for each cylinder and engine speed.

An exhaust system model calculating part 35 calculates a gas flow rate at the exhaust collecting portion (hereinbelow, to be referred to as "collecting portion gas quantity") by using a model in which a weighted average of the history of individual cylinder gas quantity is associated as the collecting portion gas quantity. Here, the exhaust system model calculating part 35 calculates a collecting portion gas quantity using the following equations, where "ev" denotes a collecting portion gas quantity, "v" denotes an individual cylinder gas quantity, and "C" denotes an output matrix.

[Equation Group 1]

$$ev(k)=CV$$

$$C=[c_1\ c_2\ c_3\ c_4]$$

$$V=[v(k-4)\ v(k-3)\ v(k-2)\ v(k-1)]^T$$

The fuel quantity at the exhaust collecting portion (hereinbelow, to be referred to as "collecting portion fuel quantity") is calculated by multiplying the collecting portion air-fuel ratio by the collecting portion gas quantity. In practice, however, the collecting portion fuel quantity is obtained by multiplying the collecting portion gas quantity by the inverse number of the collecting portion air-fuel ratio.

Figure 4:
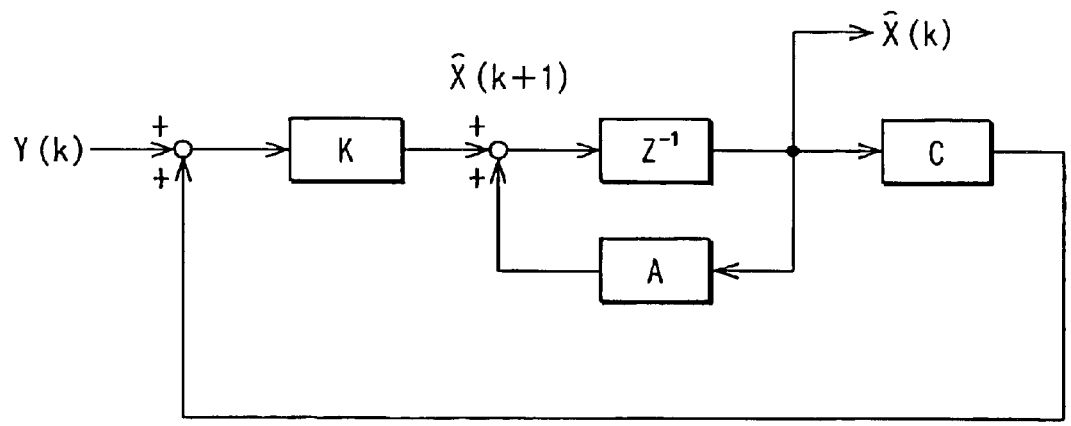
FIG. 4 is a block diagram of a Kalman filter type observer.

Further, a Kalman filter type observer 36 is constructed by a model in which the collecting portion fuel quantity is associated with the individual cylinder fuel quantity, using the individual cylinder fuel quantity as a variable, so that the individual cylinder fuel quantity is estimated from the result of observation by the observer 36. Here, for example, a model in which the collecting portion fuel quantity is associated as a weighted average of the fuel quantity history for each individual cylinder is used as the model in which the collecting portion fuel quantity is associated with the individual cylinder fuel quantity. FIG. 4 is a block diagram of the Kalman filter type observer 36.

The Kalman filter type observer 36 calculates the individual cylinder fuel quantity using the following equations, where "$\hat{X}$" (X with a hat) is an individual cylinder fuel quantity as an estimated value, "Y" denotes a collecting portion fuel quantity, "A" denotes a system matrix, "C" denotes an output matrix, and "K" denotes a Kalman gain. The representation of $\hat{X}$ (k+1|k) means that an estimated value of time k+1 is obtained from an estimated value of time "k."

[Equation Group 2]

$$\hat{X}(k+1|k)=A\hat{X}(k|k-1)+K(Y(k)-CA\hat{X}(k|k-1))$$

$$X=[x_t\ x_{t-1}\ x_{t-2}\ x_{t-3}]^T$$

$$A=\begin{bmatrix}0&1&0&0\\0&0&1&0\\0&0&0&1\\1&0&0&0\end{bmatrix}$$

$$C=[c_1\ c_2\ c_3\ c_4]$$

$$\hat{X}(k)=[f(k-4)\ f(k-3)\ f(k-2)\ f(k-1)]^T$$

By extracting f(k-1), the burnt fuel quantity for a cylinder corresponding to the calculation preceding the current one can be obtained. Then, the individual cylinder gas quantity is divided by the individual cylinder fuel quantity (estimated value) to obtain an individual cylinder air-fuel ratio. The ECU 30 feedback controls the fuel injection quantity for each of the cylinders in accordance with the difference between the individual cylinder air-fuel ratio and the target air-fuel ratio.

According to the embodiment as described in detail above, the following distinctive effects can be obtained. Since the collecting portion air-fuel ratio is calculated reflecting the history of the individual cylinder gas quantity, the collecting portion air-fuel ratio thus obtained well reflects cylinder-to-cylinder variations in gas flow rate. Accordingly, the estimation accuracy of the air-fuel ratio of each cylinder is improved, making it possible to obtain an accurate estimation result even if different cylinders have different intake air quantities. Cylinder-to-cylinder variations in gas flow rate occur during a transitional period when the operational state of the engine 10 changes, or when intake pulsation is generated in an intake pipe, but such variations can be handled appropriately. As the result, the air-fuel ratio of each cylinder can be calculated with high accuracy and thus the accuracy of controlling the fuel injection using this individual cylinder air-fuel ratio is improved.

Since the observer is constituted by the Kalman filter type observer 36, an estimated value is handled statistically and thus any estimation error can be absorbed. Therefore, it is possible to obtain a more correct air-fuel ratio for each of the cylinders. Since the collecting portion air-fuel ratio is obtained by using the sensor phase delay compensation filter 33 constituted by a Kalman filter, it is possible to obtain a true collecting portion air-fuel ratio without time delay and hence to improve the accuracy of the air-fuel ratio of each individual cylinder. Variations due to inherent differences or changes with time can also be absorbed.

Note that the present invention is not limited to the embodiment as described above, and may be embodied, for example, as follows. In the embodiment above, a model in which the collecting portion fuel quantity is associated as a weighted average of the gas quantity history of each individual cylinder is used as the model in which the collecting portion fuel quantity is associated with the individual cylinder fuel quantity. However, the invention is not limited to this and may be constituted otherwise. Further, although a model, in which the weighted average of the history of the individual cylinder gas quantity is associated as the collecting portion gas quantity, is used for calculating the collecting portion gas quantity, the invention is not limited to this and may be constituted otherwise.

In the embodiment above, the individual cylinder gas quantity is calculated by using an engine speed and load map. However, this constitution may be modified. For example, a formula may be set in advance so that the individual cylinder gas quantity is calculated each time, or the individual cylinder gas quantity may be detected separately by means of a sensor arranged in the intake or exhaust passage of each of the cylinders.

When the present invention is applied to a multicylinder internal combustion engine having an intake control system capable of controlling the intake air quantity for each of the cylinders, particularly remarkable effects can be obtained. For example, in an adjustable valve mechanism constructed such that the conditions of opening/closing the intake valve (e.g. valve lift quantity and opening/closing timing) can be variably adjusted on a continual basis. These conditions of opening/closing the valve are adjusted appropriately according to the opening of the accelerator, the operational state of the engine or the like, and the intake air quantity is thereby adjusted. In this case, the intake air quantity tends to vary among the cylinders. According to the present invention, however, the air-fuel ratio of each cylinder can be calculated accurately as described above even in such a case. Constitution of the adjustable valve mechanism is described briefly with reference to FIG. 5.

Figure 5:
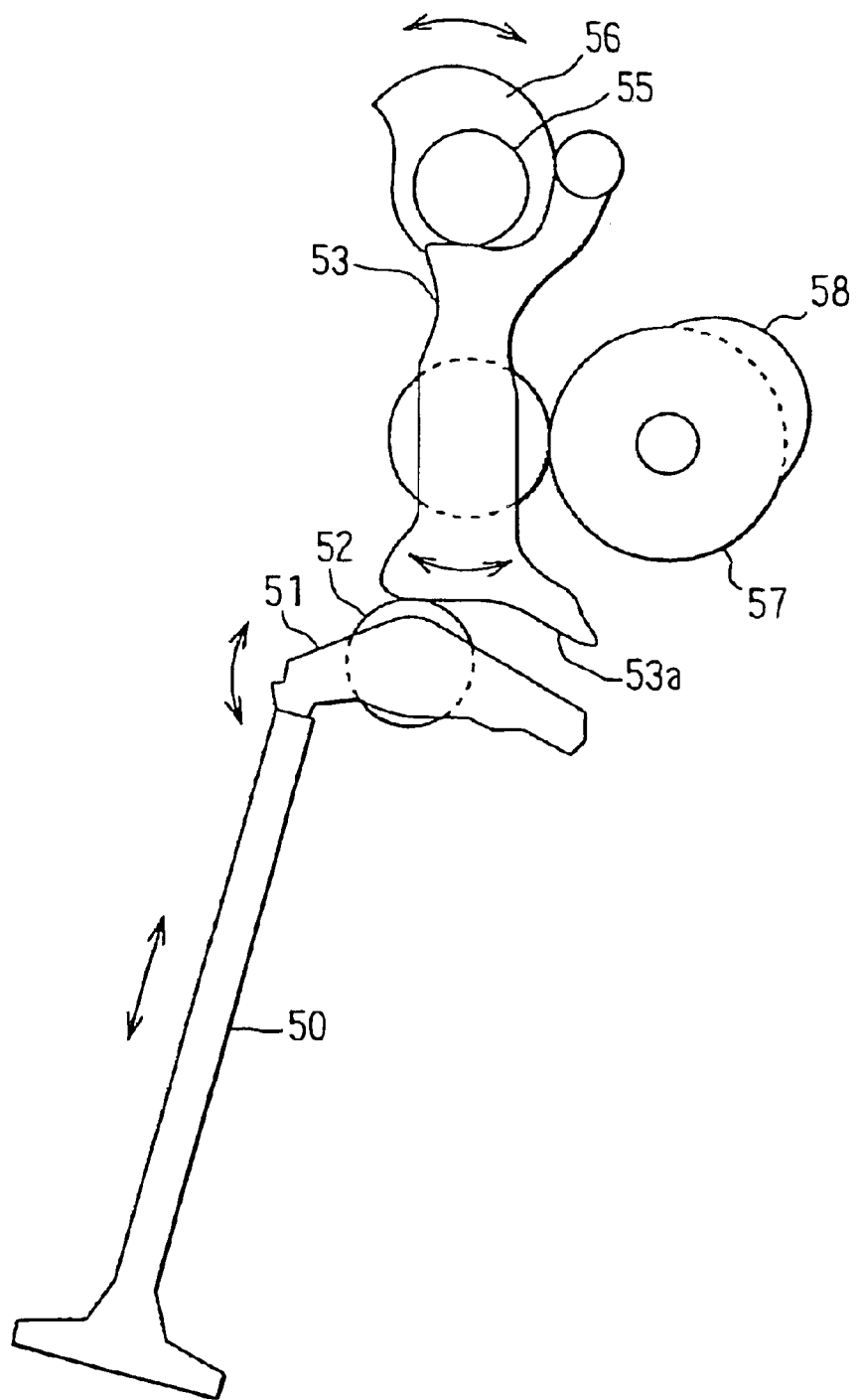
FIG. 5 is a diagram of the constitution of an adjustable valve mechanism.

In FIG. 5, a swing arm 51 swings to move an intake valve 50 upward and downward as viewed in the figure, and a link arm 53 is provided above the swing arm 51 so as to be in contact with the outer periphery of a roller 52. The link arm 53 is supported by a control shaft 55 integrally having an eccentric cam 56 and is oscillated in the left and right directions as viewed in the drawing in response to rotation of a cam shaft 57. In such constitution, as the cam shaft 57 rotates, the link arm 53 is oscillated in the left and right directions following the peripheral configuration (cam profile) of the cam 58, and the swing arm 51 is pressed by a pressing part 53a along with the oscillating motion of the link arm 53. The swing arm 51 is thereby oscillated up and down and the intake valve 21 is lifted towards the open position along with the oscillating of the swing arm 51.

The control shaft 55 is constructed such that rotation of a small angle is imparted thereto by a stepping motor or the like. When rotation is imparted to the control shaft 55, the eccentric cam 56 is also rotated integrally therewith and the support point of the link arm 53 is shifted little by little. This will change the degree of pressing the swing arm 51 and hence the valve lift quantity. By controlling the rotational angular position of the control shaft 55 minutely, the conditions for opening and closing the intake valve 21 can be adjusted continuously.

The present invention is applicable to any type of multicylinder internal combustion engine in which a plurality of exhaust gas passages of a plurality of cylinders are merged together. For example, in the case of a six-cylinder engine where two exhaust circuits are provided for two groups of cylinders each consisting of three cylinders, an air-fuel ratio sensor may be arranged at the collecting portion of each exhaust circuit and the air-fuel ratio of each cylinder may be calculated for each of the exhaust circuits as described above.

The description of the invention is merely exemplary in nature and, thus, variations that do not depart from the gist of the invention are intended to be within the scope of the invention.

What is claimed is:

1. A system for calculating an air-fuel ratio of each cylinder of an internal combustion engine, in which a plurality of exhaust passages connected to the respective cylinders are merged together at an exhaust collecting portion and an air-fuel ratio sensor is arranged at the exhaust collecting portion, for calculating an air-fuel ratio of each cylinder based on a sensor detection signal from the air-fuel ratio sensor, the system comprising:

means for calculating an air-fuel ratio at the exhaust collecting portion by receiving the sensor detection signal from the air-fuel ratio sensor;

means for calculating a gas flow rate at the exhaust collecting portion based on a gas flow rate history of each cylinder;

means for calculating a fuel quantity at the exhaust collecting portion from the calculated air-fuel ratio at the exhaust collecting portion, and the gas flow rate also at the exhaust collecting portion, as a burnt fuel quantity corresponding thereto;

means for constructing an observer using a fuel quantity of each cylinder as a variable by a model in which the fuel quantity at the exhaust collecting portion is associated with the fuel quantity of each cylinder, and estimating the fuel quantity of each cylinder from the result of observation by the observer; and means for calculating an air-flow ratio of each cylinder from the fuel quantity of each cylinder thus estimated.

2. The system for calculating an air-fuel ratio of each cylinder of an internal combustion engine according to claim 1, wherein the model in which the fuel quantity at the exhaust collecting portion is associated with the fuel quantity of each cylinder is a model in which the fuel quantity at the exhaust collecting portion is associated as a weighted average of a fuel quantity history of each cylinder.

3. The system for calculating an air-fuel ratio of each cylinder of an internal combustion engine according to claim 1, wherein the fuel quantity of each cylinder is estimated by a Kalman filter type observer.

4. The system for calculating an air-fuel ratio of each cylinder of an internal combustion engine according to claim 1, wherein the gas flow rate at the exhaust collecting portion is calculated by using a model in which a gas flow rate for each cylinder is associated with the gas flow rate at the exhaust collecting portion.

5. The system for calculating an air-fuel ratio of each cylinder of an internal combustion engine according to claim 4, wherein the gas flow rate at the exhaust collecting portion is calculated by using a model in which a weighted average of the gas flow rate history of each cylinder is associated as the gas flow rate at the exhaust collecting portion.

6. The system for calculating an air-fuel ratio of each cylinder of an internal combustion engine according to claim 1, further comprising:

means for compensating a phase delay of the sensor detection signal sent by the air-fuel ratio sensor, to calculate the fuel quantity at the exhaust collecting portion based on output from the compensating means and the gas flow rate at the exhaust collecting portion.

7. A system for calculating an air-fuel ratio of each cylinder of an internal combustion engine in which exhaust gases from respective cylinders are merged at an exhaust collecting portion, an air-fuel ratio at the exhaust collecting portion is detected by an air-fuel ratio sensor, and an air-fuel ratio of each cylinder is calculated based on a sensor detection signal from the air-fuel ratio sensor, wherein the air-fuel ratio at the exhaust collecting portion is calculated based on the sensor detection signal and a gas flow rate history of each cylinder, and an observer using the air-fuel ratio of each cylinder as a variable is constructed by a model in which the air-fuel ratio at the exhaust collecting portion is associated with the air-fuel ratio of each cylinder, to estimate the air-fuel ratio of each cylinder based on the result of observation by the observer.

8. The system for calculating an air-fuel ratio of each cylinder of an internal combustion engine according to claim 7, wherein the air-fuel ratio at the exhaust collecting portion is calculated by using a sensor model for compensating a phase delay of the sensor detection signal output by the air-fuel ratio sensor.

9. The system for calculating an air-fuel ratio of each cylinder of an internal combustion engine according to claim 8, wherein the system is applied to a multicylinder internal combustion engine utilizing an intake control system capable of controlling an intake air quantity of each cylinder.

10. The system for calculating an air-fuel ratio of each cylinder according to claim 9, wherein the system is applied to a fuel injection control system of a multicylinder internal combustion engine to feedback control the fuel injection quantity of each cylinder by using the each cylinder obtained.

* * * * *